United States Patent
Werkmeister et al.

(10) Patent No.: US 10,710,193 B2
(45) Date of Patent: Jul. 14, 2020

(54) CONNECTING ELEMENT FOR PRODUCING A FRICTION-WELDING CONNECTION

(71) Applicant: EJOT GMBH & CO. KG, Bad Berleburg (DE)

(72) Inventors: Marco Werkmeister, Leinatal (DE); Mario Maiwald, Creuzburg (DE); Gerhard Dubiel, Tambach-Dietharz (DE); Daniel Spindler, Friedrichroda (DE); Marco Mielisch, Erfurt (DE)

(73) Assignee: EJOT GMBH & CO. KG, Bad Berleburg (DE)

( * ) Notice: Subject to any disclaimer, the term of this patent is extended or adjusted under 35 U.S.C. 154(b) by 24 days.

(21) Appl. No.: 15/549,138

(22) PCT Filed: Feb. 3, 2016

(86) PCT No.: PCT/EP2016/052290
§ 371 (c)(1),
(2) Date: Aug. 4, 2017

(87) PCT Pub. No.: WO2016/124647
PCT Pub. Date: Aug. 11, 2016

(65) Prior Publication Data
US 2018/0021883 A1 Jan. 25, 2018

(30) Foreign Application Priority Data
Feb. 5, 2015 (DE) .................... 10 2015 202 074

(51) Int. Cl.
*B23K 20/12* (2006.01)
*B23K 35/02* (2006.01)
(52) U.S. Cl.
CPC ........ *B23K 20/1255* (2013.01); *B23K 20/127* (2013.01); *B23K 35/0255* (2013.01)

(58) Field of Classification Search
CPC .. B23K 20/12; B23K 20/125; B23K 20/1255; B23K 20/127; B29C 65/0681; F16B 11/004
(Continued)

(56) References Cited

U.S. PATENT DOCUMENTS 3,426,394 A * 2/1969 Poupitch ............ B23K 11/0066
219/94
3,477,115 A 11/1969 Martin et al.
(Continued)

FOREIGN PATENT DOCUMENTS

CN 101468421 7/2009
DE 19620814 11/1997
(Continued)

OTHER PUBLICATIONS

German Patent and Trademark Office, German Search Report, dated Feb. 27, 2015, pp. 1-7, Application No. 102015202074.6, Applicant: EJOT GMBH & Co. KG.
(Continued)

*Primary Examiner* — Michael P Ferguson
(74) *Attorney, Agent, or Firm* — Woodling, Krost and Rust

(57) ABSTRACT

The invention relates to a connecting element (10, 20, 30, 50) for producing a component connection (70) of two components (72, 74; 92) lying against each other by means of the connecting element (10, 20, 30, 50), which is welded to the lower layer (74)—the base layer—by friction, wherein the connecting element (10, 20, 30, 50) has a shaft (18), which has a shaft segment (14) and a head (12) having a flat surface (20) lying on the top side of the head for transmitting the axial force, wherein a drive cutout (22, 32) is introduced into the flat surface (20) in order to transmit a torque. The invention is characterized in that a continuous diameter
(Continued)

increase starting at an ascent level (A) on the shaft segment (18) to the bottom side of the head results, wherein the distance from the ascent level (A) to a head bottom-side level (K), which has the greatest distance from the shaft end, is less than half the difference between the head outside diameter and the shaft diameter at the ascent level (DA−DS)/2 (D2) and greater than a quarter of the difference between the head outside diameter and the shaft diameter at the ascent level (DA−DS)/4 (D1).

9 Claims, 4 Drawing Sheets

(58) Field of Classification Search
USPC .......................................................... 411/171
See application file for complete search history.

(56) References Cited

U.S. PATENT DOCUMENTS

| | | | | |
|---|---|---|---|---|
| 3,774,009 | A * | 11/1973 | Hodges | B23K 11/0066 219/98 |
| 7,685,690 | B2 * | 3/2010 | Ghiran | B21D 26/035 29/421.1 |
| 8,486,508 | B2 * | 7/2013 | Christ | B23K 20/12 428/139 |
| 8,552,332 | B2 * | 10/2013 | Aoyama | B23K 11/0053 219/86.1 |
| 2003/0136810 | A1 | 6/2003 | Stevenson et al. | |
| 2003/0201254 | A1 * | 10/2003 | Sichtermann | B21K 1/44 219/98 |
| 2004/0232209 | A1 | 11/2004 | Stol et al. | |
| 2006/0028859 | A1 | 2/2006 | Forbes | |
| 2006/0213954 | A1 * | 9/2006 | Ruther | B21J 15/027 228/113 |
| 2013/0223921 | A1 * | 8/2013 | Christ | B23K 20/129 403/270 |

FOREIGN PATENT DOCUMENTS

| | | |
|---|---|---|
| DE | 102005006253 | 8/2006 |
| DE | 102006028529 | 1/2007 |
| DE | 102009006775 | 10/2009 |
| DE | 102008028687 | 12/2009 |
| EP | 2289659 | 3/2011 |
| JP | 2000510768 | 8/2000 |
| JP | 200401784 | 1/2004 |
| JP | 2004106046 | 4/2004 |
| JP | 2015139788 A | 8/2015 |

OTHER PUBLICATIONS

European Patent Office, International Search Report, dated May 31, 2016, pp. 1-4, Application No. PCT/EP2016/052290, Applicant: EJOT GMBH & Co. KG.

European Patent Office, Written Opinion of the International Search Report, pp. 1-7, Application No. PCT/EP2016/052290, Applicant: EJOT GMBH & Co. KG.

Taiwan Intellectual Property Office, Official Letter, Office Action, dated Aug. 8, 2017, pp. 1-13, Applicant: EJOT GMBH & Co. KG.

Taiwan Intellectual Property Office, Translation of Official Letter, Office Action, dated Aug. 8, 2017, pp. 1-13, Applicant: EJOT GMBH & Co. KG.

Taiwan Patent Office, Official Letter, Office Action, dated Apr. 25, 2018, pp. 1-22, Applicant: EJOT GMBH& Co. KG.

China National Intellectual Property Administration, Office Action, dated Aug. 6, 2019, pp. 1-6.

Japan Patent Office, Notification of Reason for Refusal, Office Action, dated Oct. 29, 2019.

Japan Patent Office, English Translation of Notification of Reason for Refusal, Office Action, dated Oct. 29, 2019, pp. 1-6.

Korean Intellectual Property Office, Notice of Preliminary Rejection, Office Action, dated Nov. 29, 2019, pp. 1-6.

Korean Intellectual Property Office, English Translation of Notice of Preliminary Rejection, Office Action, dated Nov. 29, 2019, pp. 1-4.

Japan Patent Office, Notification of Reason for Refusal, Office Action, dated Oct. 29, 2019, pp. 1-4, Patent Application No. 2017-541279.

Japan Patent Office, English Translation of the Notification of Reason for Refusal, Office Action, dated Oct. 29, 2019, pp. 1-11, Patent Application No. 2017-541279.

* cited by examiner

CONNECTING ELEMENT FOR PRODUCING A FRICTION-WELDING CONNECTION

This patent application is the national phase entry of PCT/EP2016/052290, international application filing date Feb. 3, 2016, which claims the benefit and priority of and to German patent application no. 10 2015 202 074.6, filed Feb. 5, 2015.

PCT/EP2016/052290, international application filing date Feb. 3, 2016 and German patent application no. 10 2015 202 074.6, filed Feb. 5, 2015 are incorporated herein by reference hereto in their entireties.

FIELD OF THE INVENTION

The invention relates to a connecting element for producing a component connection of two components lying against each other.

BACKGROUND OF THE INVENTION

EP 2 289 659 A1 discloses a friction-welding member having a head and a shaft, with a drive being formed in the head. The head has a flat surface which is suitable for transmitting the axial force. The head furthermore has a recess formed in its underside, which recess is adapted to accommodate any material softened during the friction-welding process, in particular material from the top layer.

The shaft of the connecting element is friction-welded to the lower base layer of the composite component. The projecting length of the head ensures a positive connection between the base and top layers. The base and top layers are thus firmly connected to each other by means of the connecting element.

A setting tool is provided for producing the friction-welding connection, which tool comprises a hold-down device and a drive tool. The hold-down device presses the component layers to be connected onto each other, while the drive tool presses down on and rotates the connecting element, thus driving it into the composite component.

This design has the disadvantage that it has to be of a high overall height and small in diameter.

SUMMARY OF THE INVENTION

It is the object of the invention to provide a connecting element and a setting tool for producing a component connection which element makes it possible to produce a component connection of only low structural height, especially with thin metal sheets, with a small head diameter.

In accordance with the invention, the connecting element is designed so as to continuously increase in diameter, from its cylindrical shaft to the underside of its head. The underside of the head is defined by the level at the underside of the head which is at a maximum distance from the end of the shaft.

According to the invention, the distance A from the ascent level to the level at the underside of the head is less than half the difference between the outside diameter of the head and the shaft diameter and greater than a quarter of the difference between the outside diameter of the head and the shaft diameter, i.e.

$$(D_A-D_S)/4 < A < (D_A D_S)/2$$

As a result, any top layer material softened during penetration of the connecting element will be directed to the widened portion which increases in diameter. Nevertheless, a sufficient distance will remain between the material of the connecting element which rises as a weld bead and the head level, thus ensuring sufficient pull-out resistance.

More specifically, the shaft diameter is the diameter of the connecting element at the ascent level.

Additional softened material which is not required for producing the connection will be forced out laterally (radially to the outside) from the head. In this way, a low structural height can be achieved.

In an advantageous embodiment of the invention, the slope starts at the ascent level which slope forms an angle of less than 80°, in particular an angle of less than 70°, with the normal relative to the axis of the connecting element.

This ensures that any displaced softened material from the top layer will be directed radially to the outside.

In another embodiment of the invention the connecting element can have a first shaft portion which is cylindrical.

This design can be produced in a particularly economical manner.

In another preferred embodiment of the invention, the height of the drive cutout may be provided to be less than 30% of the radial extension of the drive cutout.

As a result, the head itself can be designed to have a small axial extension, thus allowing the structural height to be reduced even more.

The drive structure and the melting area at the connection site need to be sufficiently spaced from each other since the temperature increase caused by the friction-welding process will additionally soften the drive structures, thus adversely affecting the transmission of the driving torque.

In another advantageous embodiment, the head of the connecting element is designed such that the peripheral region of the head tapers off at an angle of between 85° and 95°, in particular 90°, relative to the screw axis.

This embodiment, in which especially the level at the underside of the head is also in the peripheral region, provides a maximum retention force since firstly there is a maximum distance between the welding bead and the underside of the head and secondly a particular good form fit is obtained owing to the almost orthogonal position of the head surface.

In another advantageous embodiment, the diameter increases according to a function which in the direction of the head—has a first slope and a second subsequent slope with respect to the normal relative to the screw axis, said second slope being smaller than said first slope.

In accordance with this embodiment, a course is obtained which at least approximates a concave contour. As a result, a particularly advantageous undercut is obtained between the welding bead created by the rising material and the head, which undercut will be filled with the softened material from the top layer after completion of the friction-welding process.

The approximation to this concave contour can be improved further by providing a third area with a third slope following the second area, which third slope is smaller than the area of the second slope.

Ideally, the course is concave in the form of an elliptical or circular contour.

The curvature radius may preferably be larger than the distance from the underside of the head to the ascent level.

This ensures a particularly soft transition which results in any displaced softened material from the top layer being ideally directed out of the area between the head and the top layer.

In yet another embodiment the shaft, at a front-side end thereof, may transition from a cylindrical shaft portion into a conical shaft portion. This improves the centering characteristics of the connecting element. More specifically, the full taper angle is between 60° and 80°.

In yet another embodiment of the invention, another cylindrical portion may follow the conical portion, which improves the centering characteristics since the cylindrical portion can be introduced particularly well into the top layer.

In yet another aspect the invention relates to a component connection. The component connection comprises the base layer and at least one top layer and a connecting element of the above described type. The connecting element comprises at least a head and a shaft, with the front face of shaft being welded on to the base layer. Consequently, a cohesive connection is achieved between the shaft of the connecting element and the base layer, with the head fixing the top layer in a positive-locking manner.

According to the invention, the material discharged laterally (radially to the outside) via the head at least partially surrounds the head laterally in an axial direction. The head is located above the level of the surface of the top layer.

In order to achieve a corresponding component connection, a connecting element of the aforementioned type is preferably introduced.

The invention furthermore relates to a setting tool for producing a component connection of the aforementioned type. The setting tool comprises a hold-down device and a drive bit. The drive bit has a raised drive structure on its flat base. This drive structure is designed to match an inner drive of the connecting element. According to the invention the planar base is confined by a raised border. This border has an internal diameter.

The border thus provided will direct any softened material displaced laterally from the head to the outside during the friction-welding process such that the material will not enter the space between the drive bit and the hold-down device surrounding the drive bit. As a result of this direction of softened material from the top layer, the displaced material will accumulate within the internal diameter and pile up there to such an extent that it will at least partially enclose the head laterally. This improves the shearing strength.

This design makes it possible to obtain a low structural height and yet maintain a high strength, since the softened material displaced from underneath the head is still used to increase the strength of the connection.

In another advantageous embodiment, the hold-down device can have a tapered front face. Providing a taper on the inner edge helps prevent the cooled-down softened material from becoming stuck on the hold-down device. As a result, the hold-down device can be reliably removed from the top layer with little resistance.

Furthermore, at least two suction holes can be provided in the base. These suction holes are used to generate a negative pressure between the head of the inserted connecting element and the base, resulting in the element to be sucked onto the base and the drive structure to engage the inner drive of the connecting element.

More specifically, the suction bores are arranged off-center and spaced from the border by at least 5%, in particular at least 10%, in particular at least 15%, in particular at least 17%, of the internal diameter. As a result, an inserted connecting element whose head diameter is between 60% and 90% of the internal diameter of the border, can still be sucked into contact via the edge of its head. The suction effect thus acts on the coolest possible position of the connecting element so as to prevent softened material of the connecting element from entering the suction bore.

When a head is used which is substantially smaller in diameter than the internal diameter of the border, this will result in top layer material displaced from the intermediate area in the joining process to be accommodated in the area on the side of the head. This provides an additional receiving volume, thus allowing the structural height to be minimized, at the same time maintaining an as small as possible diameter of the connection.

The suction bores are preferably tangent to a radius which is spaced from the border by at least 5% of the internal diameter of the border. The radius can be concentric with the border and have a diameter of between 60% and 90%, in particular 60% to 80%, of the internal diameter.

The invention furthermore relates to a connecting system comprising a setting tool of the aforementioned type and a connecting element of the aforementioned type. According to the invention, the setting tool and the connecting element are adapted to each other such that the internal diameter of the border is larger by at least 10% than the diameter of the head of the connecting element.

In another advantageous embodiment, the height of the border may be higher than the maximum extension of the head in an axial direction. At any rate the height of the border extends beyond the head underside level of the connecting element.

Additional advantages, features and possible applications of the present invention may be gathered from the description which follows, in connection with the embodiments illustrated in the drawings.

Throughout the description, claims and drawings, those terms and associated reference signs are used as are listed in the List of Reference Signs below.

BRIEF DESCRIPTION OF THE DRAWINGS

In the drawings,

FIG. 4b is a top view of the front face of the drive bit of FIG. 4a;

FIG. 7 is an enlarged view of a detail similar to FIG. 6a.

DESCRIPTION OF THE INVENTION

Figure 1A:
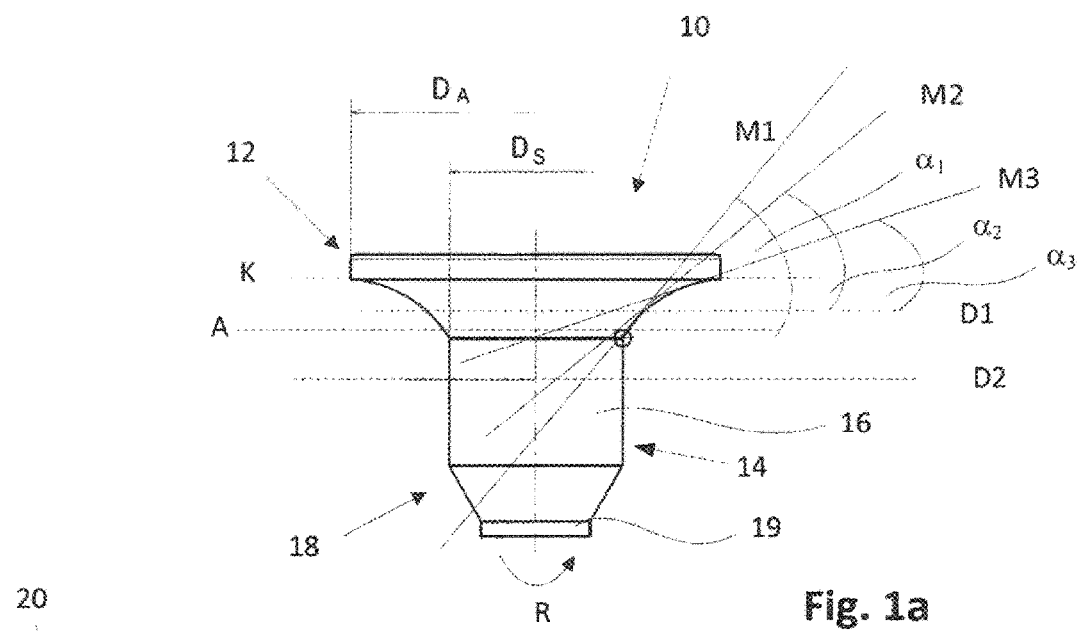
FIG. 1a is a lateral view of a connecting element according to the invention.

FIG. 1a is a lateral view of a connecting element 10 according to the invention. The connecting element 10 comprises a head 12 and a shaft 14, which shaft 14 has a cylindrical portion 16. On the cylindrical portion 16, starting at an ascent level A, the shank continuously widens until up to the underside of the head at a head level K. The head level K is the level which is at the maximum distance from the shaft end. For the present connecting element 10, this is the edge of the head.

The continuous increase in diameter proceeds along a curvature of a curvature radius R. The increase in diameter starts at an ascent level A which is located at a distance of between $D1=(D_A-D_S)/4$ and $D2=(D_A-D_S)/2$ from the head underside level K. This embodiment produces a displacement behavior in the case of a thin cover plate which is described in more detail with reference to FIG. 2.

Furthermore, the end of the connecting element 10 which faces away from its head has a conical portion 18. The presence of this conical portion 18 results in a reduction of the front face of the shaft. As a result, the connecting element will be centered better during introduction. The illustrated connecting element 10 moreover has a cylindrical projection following its conical portion which easily penetrates a top layer and thus further improves the centering of the connecting element 10.

In this embodiment, the diameter increases with a continuous decrease in slope with respect to the normal N relative to the screw axis, which diameter also comprises a first slope $M1(\alpha_1)$ and a subsequent second slope $M2(\alpha_2)$.

Figure 1B:
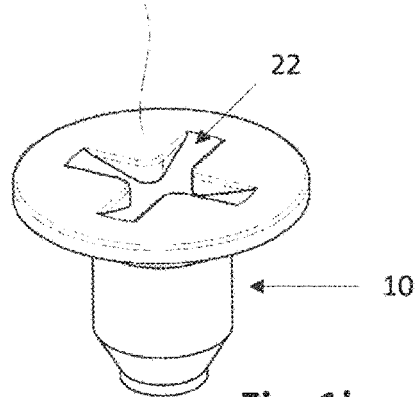
FIG. 1b is a perspective view of a connecting element according to the invention.

FIG. 1b is a perspective view of a connecting element 10 according to the invention, which has an inner drive 22 provided in its flat head surface 20, which screw drive 22 is in the form of a cross recess.

Figure 1C:
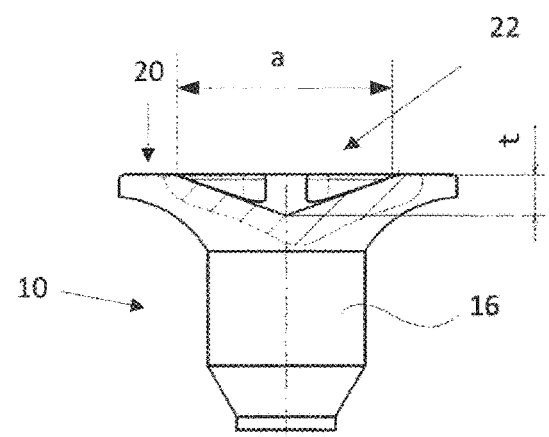
FIG. 1c is a partial sectional view of the connecting element.

FIG. 1c is a partial sectional view of a connecting element 10, which view shows that the depth t of the screw drive is only 30%, at the most, of the maximum extension a of the drive in a radial direction. Such a design is possible because the axial forces required for the friction-welding connection are transmitted via the flat head 20. As the inner drive needs to be spaced a certain distance from the shaft 16 owing to the heat generated in the friction-welding process, the low drive depth t allows for a low axial extension of the head and thus a low structural height.

Figure 2:
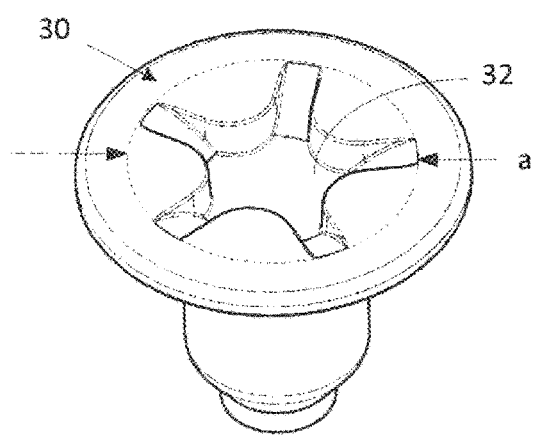
FIG. 2 is a perspective view of a connecting element according to the invention.

FIG. 2 is a perspective view of a connecting element 30 according to the invention, which—in contrast to the connecting element shown in FIG. 1b—has a drive recess 32 in the form of a five-pointed star. This improves the transmission of torque in the case of a high temperature increase. The dotted line indicates the radius of the drive structure and its maximum extension a in a radial direction.

Figure 3:
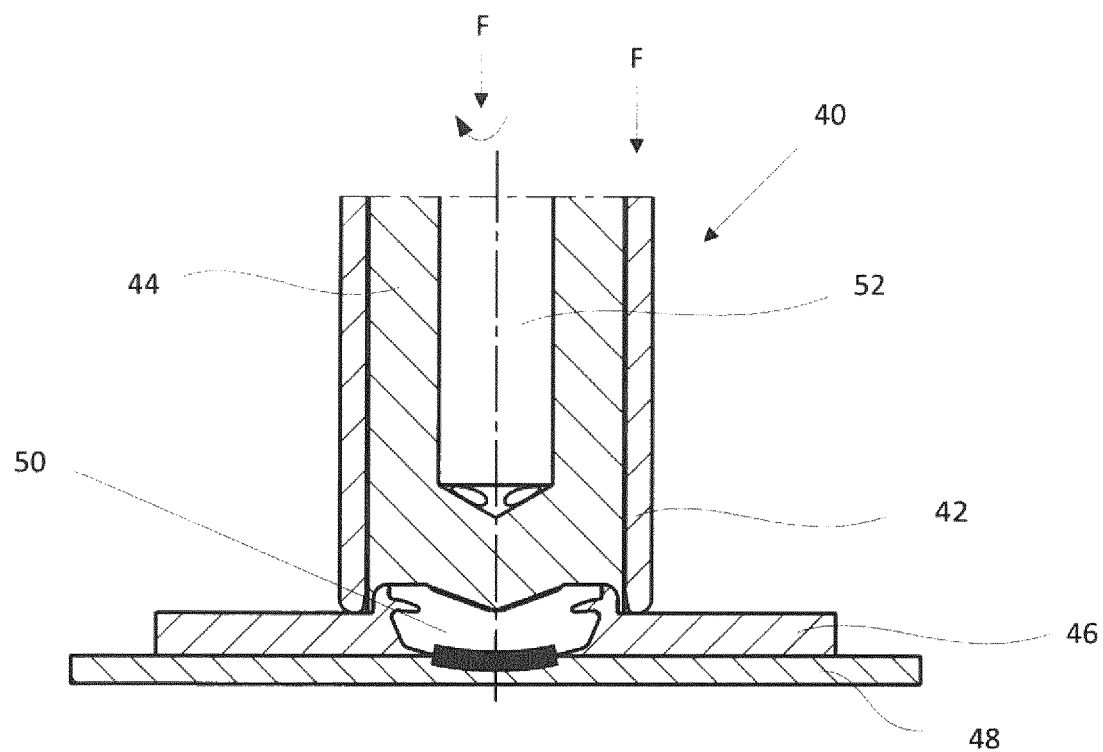
FIG. 3 is a schematic sectional view of a setting tool according to the invention.

FIG. 3 is a schematic sectional view of a setting tool 40 according to the invention. The setting tool 40 comprises a hold-down device 42 and a drive bit 44. The hold-down device 42 is used to press the component layers 46, 48 together during the connection process. The drive bit 44 is rotatably mounted relative to the hold-down device 42 and presses down on and rotates the connecting element 50 so as to introduce it into the component layers 46, 48. The material of the upper top layer 46 is preferably a light metal, in particular aluminum, whereas the base layer 48 is made of high-tensile steel. The drive bit 44 has a central suction channel 52 which can be used to generate a negative pressure on the contact surface so as to hold the connecting element 50 on the drive bit 44 during the connecting process. The design of the front face end of the drive bit 44 will be explained in more detail with reference to the following FIGS. 4a, 4b.

Figure 4A:
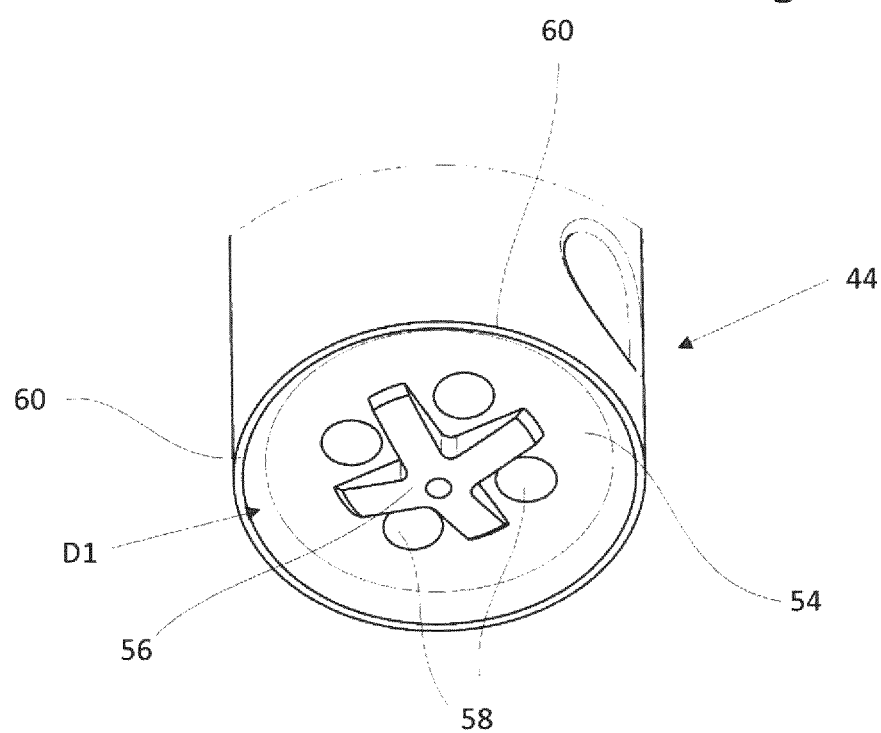
FIG. 4a is perspective view of the front-face end of the drive bit of FIG. 3.

FIG. 4a is a perspective view of the front face end of the drive bit 44. The drive bit 44 has a flat base 54. Raised drive structures 56 are provided on the flat base 54 which are used to drive a matching connecting element with an inner drive, in which case the axial force is transmitted to the connecting element via the flat base. Between the drive structures 56 suction bores 58 are provided which are connected to the central suction channel so as to communicate with it. The flat base 54 is surrounded by a border 60 which is raised relative to the flat base 54.

Figure 4B:
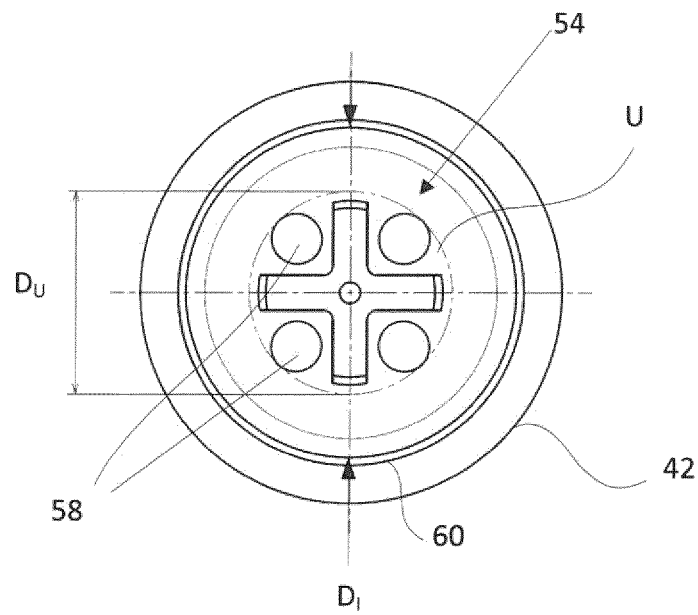

FIG. 4b is a top view of a front face of the drive bit 44. The suction bores 58 contact a radius U. The border 60 has an internal diameter D1. The border and the radius U are concentric, with the diameter DU of the radius U being approx. 65% of the internal diameter D1 of the border. Consequently, suction con-tact can even be made with the edge region of connecting elements having a substantially smaller head diameter than the internal diameter D1 of the border. The suction points on the connecting element are then ideally arranged at a distance from the center of the connecting element.

Figure 5:
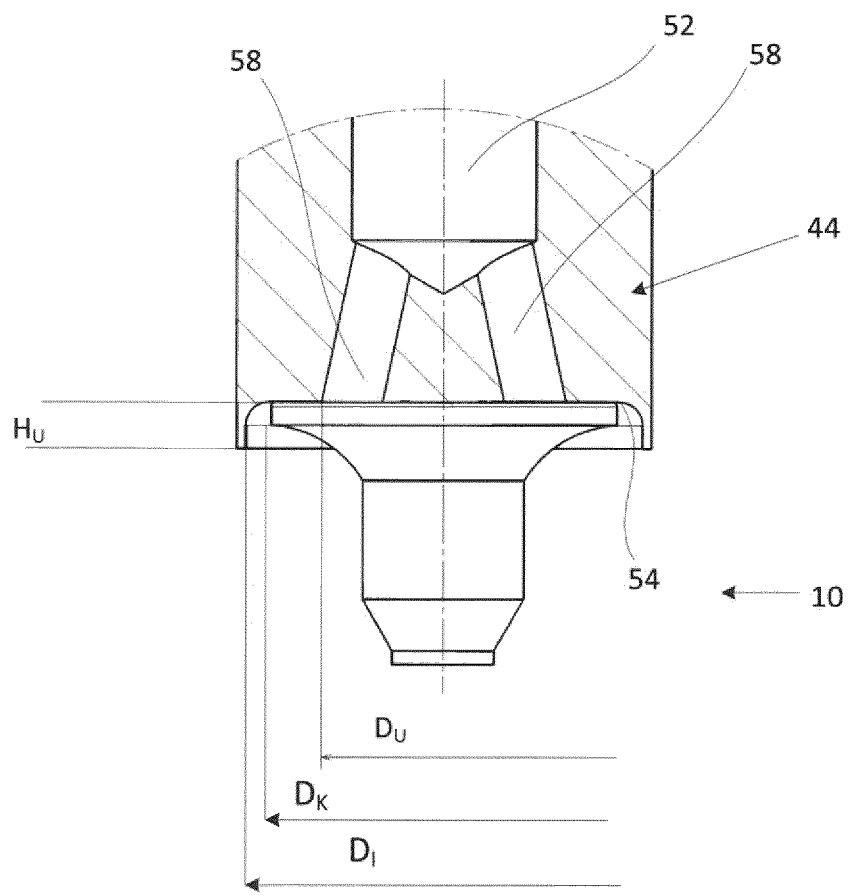
FIG. 5 is a partial sectional view of a drive bit with a connecting element inserted in it.

FIG. 5 is a partial sectional view of a drive bit 44 with a connecting element 10 inserted therein. The drive bit 44 has a central suction channel 52 to which the suction bores 58 are connected. The inserted connecting element 10 has a head diameter $D_K$ which is approx. 90% of D1. In this view the height $H_U$ of the raised border 60 can be seen particularly well. The border extends beyond the head underside level K of the connecting element. This ensures that any material radially displaced to the outside during setting will be entrained by the drive bit and directed such that it cannot enter the space between the hold-down device (not shown) surrounding the drive tool and the drive bit. The area between the head level K and the flat base 54 can receive material from the top layer, which allows the structural height to be maintained with a reduced diameter.

Figure 6:
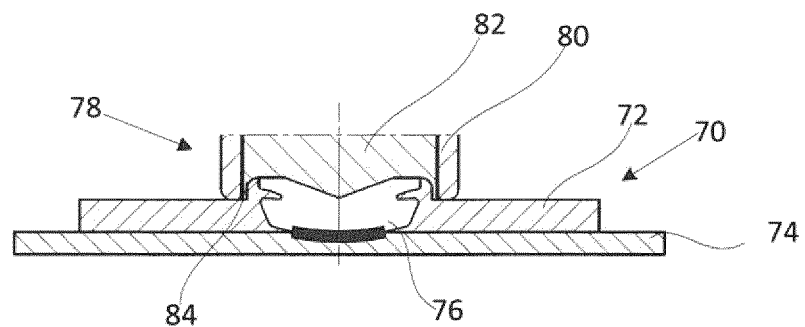
FIG. 6 is a sectional view of component connection produced at the end of a setting process.

FIG. 6 is a sectional view of a component connection 70 produced at the end of a setting process. The component connection 70 comprises a top layer 72 and a base layer 74 which layers are connected to each other by means of a connecting element 76. The connecting element 76 is cohesively connected to the base layer by means of welding, whereas the top layer 72 is positively held on the connecting element 76. Furthermore, a setting tool 78 is indicated which comprises a hold-down device 80 which presses down on the component connection, thus clamping the top layer 72 and the base layer 74 together.

The drive bit 82 has a border 84 of a height sufficient to ensure that, upon completion of the setting process, the border will abut on the level of the top layer 72 and thus be flush with the hold-down device 80.

Figure 6A:
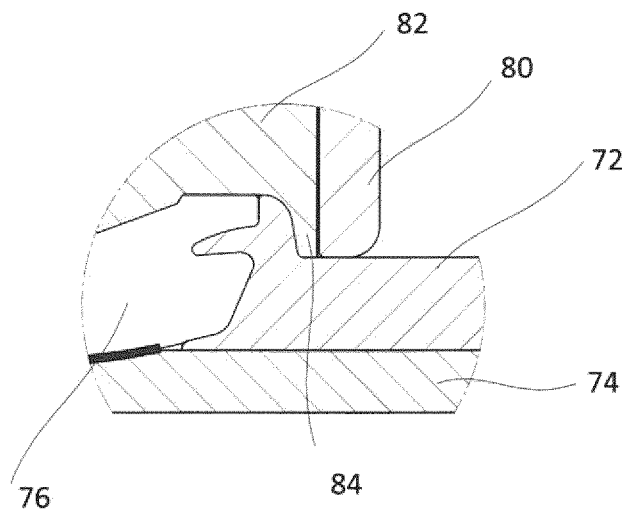
FIG. 6a is an enlarged view of a detail of FIG. 6.

FIG. 6a is an enlarged view of a detail of FIG. 6. This view shows particularly well how softened and displaced material from the top layer 72 is received between the head and the material of the connecting element 76 which rises during the friction-welding process performed on the base layer 74. Because the hold-down device 80 and the border 84 will come to abut on the same level at the end of this process, only a minor taper is required on the hold-down device 80 since the material from the top layer 72 will predominantly be retained within the border 84 and the hold-down device 80 itself does not primarily serve as a mold.

Figure 7:
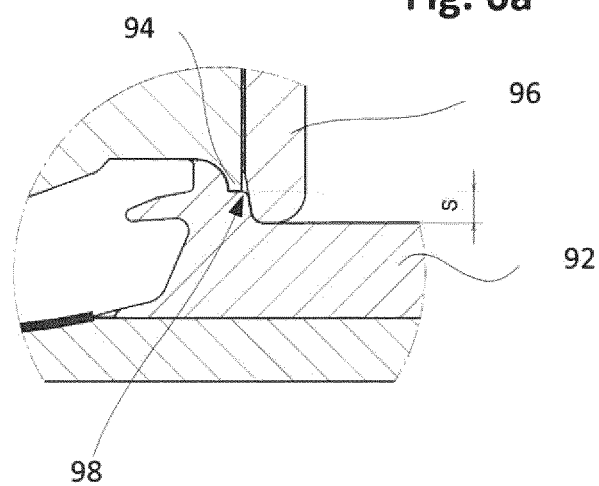

FIG. 7 is an enlarged view of a detail similar to the view of FIG. 6. In the design illustrated in FIG. 7, the border 94 is chosen such that it will be spaced from the level of the top layer 92 by a distance S at the end of the setting process. As a result, the border 94 will redirect any material displaced from the top layer 92 during the friction-welding process in such a way that it will not enter the space between the drive bit and the hold-down device 96, and still allow the material displaced from the top layer 92 to also be confined by the hold-down device 96 in this design. Because the maximum structural dimensions are as a rule defined by the hold-down device 96, additional receiving volume can be created in this way, thus allowing the overall height to be reduced further while maintaining the same external dimensions. In this embodiment, the hold-down device 96 is provided with a taper along its inner edge. This facilitates removal of the hold-down device 96 following the setting process since it prevents the hold-down device 96 from becoming stuck on the transformed material from the top layer 92.

The invention claimed is:

1. A component connection, comprising:
a base layer having a top surface;
a top layer having a top surface and a bottom surface, the bottom surface being superimposed on the top surface of the base layer; and
a friction-welding connecting element comprising a head and a shaft;
said head being cylindrically shaped and having an outermost radial peripheral face having an outside diameter (DA), said head having an underside, a flat top side configured for transmitting an axial force, and a drive cutout being formed in said flat top side for transmission of torque;
said shaft having a cylindrical shaft segment having a shaft diameter (DS), an arcuate portion extending from an upper end of the shaft segment at an ascent level (A), and an end of the shaft extending from a lower end of the shaft segment configured for penetrating the top layer, the arcuate portion comprising an annular concave contour having a continuous diameter increase starting at said ascent level to said underside of said head at a level (K);
wherein the distance of said ascent level (A) from said underside of said head, level (K), is less than half the difference between the outside diameter of the head and the shaft diameter, (DA−DS)/2, and greater than a quarter of the difference between said outside diameter of the head and said shaft diameter, (DA−DS)/4;
said connecting element transmitting axial force downwardly and rotated such that said end of said shaft of said connecting element penetrates the top layer and is friction-welded to said base layer and such that the cylindrical shaft segment is deformed radially outwardly defining an annular undercut between the cylindrical shaft segment and the underside of said head, said undercut interlockably receiving displaced softened material from said top layer to secure said top layer to said base layer, and said head residing above said top surface of said top layer and displaced material of said top layer extending upwardly to radially encompass said outermost radial peripheral face of said head.

2. The component connection according to claim 1, characterized in that the slope (M1) of the arcuate portion of the shaft at the ascent level (A) forms an angle ($\alpha_1$) of less than 80° with the normal.

3. The component connection according to claim 1, characterized in that a depth (t) of the drive cutout is less than 30% of a radial extension (a) of the drive cut-out.

4. The component connection according to claim 1, characterized in that an edge region of said head tapers off at an angle of between 85° and 95°, relative to the axis of rotation of the connecting element.

5. The component connection according to claim 1, characterized in that the diameter of said shaft increases according to a function, which in the axial direction of the head has a first slope (M1, $\alpha_1$) and a second slope (M2, $\alpha_2$) with respect to the normal relative to the axis of rotation (R) of the connecting element, said second slope (M2, $\alpha_2$) being smaller than said first slope (M1, $\alpha_1$).

6. The component connection according to claim 1, characterized in that the diameter of said shaft increases according to a function, which in the axial direction of the head (12) has a first slope (M1, $\alpha_1$), a second slope (M2, $\alpha_2$) and a third slope (M3, $\alpha_3$) with respect to the normal relative to the axis of rotation (R) of the connecting element, said second slope (M2, $\alpha_2$) being smaller than said first slope (M1, $\alpha_1$) and said third slope (M3, $\alpha_3$) being smaller than said second slope (M2, $\alpha_2$).

7. The component connection according to claim 6, characterized in that such increase occurs along a curvature whose radius is larger than the distance of the point from said underside of said head.

8. The component connection according to claim 1, characterized in that the connecting element tapers conically at the end of said shaft at a taper angle of between 60° and 80°.

9. The component connection according to claim 8, characterized in that at the end of said shaft, a cylindrical segment (19) follows after a cone (18).

* * * * *